United States Patent
Sankruthi et al.

(10) Patent No.: US 10,061,683 B2
(45) Date of Patent: Aug. 28, 2018

(54) SYSTEMS AND METHODS FOR COLLECTING ERROR DATA TO TROUBLESHOOT PRODUCT ERRORS

(71) Applicant: Symantec Corporation, Mountain View, CA (US)

(72) Inventors: Anand Sankruthi, Chennai (IN); Chengi Kuo, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 80 days.

(21) Appl. No.: 15/150,670

(22) Filed: May 10, 2016

(65) Prior Publication Data

US 2017/0277618 A1  Sep. 28, 2017

(51) Int. Cl.
*G06F 11/00* (2006.01)
*G06F 11/36* (2006.01)
*G06F 17/30* (2006.01)

(52) U.S. Cl.
CPC ........ *G06F 11/366* (2013.01); *G06F 11/3692* (2013.01); *G06F 17/30867* (2013.01)

(58) Field of Classification Search
CPC .. G06F 11/366; G06F 11/3692; G06F 11/302; G06F 11/3065; G06F 11/3089; G06F 11/362; G06F 17/30867
See application file for complete search history.

(56) References Cited

U.S. PATENT DOCUMENTS

| | | | | |
|---|---|---|---|---|
| 2005/0050159 A1* | 3/2005 | Suraski | ................ | G06F 11/362 709/217 |
| 2011/0296243 A1* | 12/2011 | Calman | ................ | G06F 11/079 714/26 |
| 2016/0042275 A1* | 2/2016 | Dettman | ............... | G06F 11/366 706/46 |
| 2017/0140285 A1* | 5/2017 | Dotan-Cohen | ........ | G06N 5/048 |
| 2017/0235660 A1* | 8/2017 | Chana | ................... | G06F 11/366 714/38.14 |

OTHER PUBLICATIONS

Debug menu, https://en.wikipedia.org/wiki/Debug_menu, as accessed Mar. 2, 2016, Wikipedia, (Sep. 13, 2006).
(Continued)

*Primary Examiner* — Joseph D Manoskey
(74) *Attorney, Agent, or Firm* — FisherBroyles, LLP

(57) ABSTRACT

The disclosed computer-implemented method for collecting error data to troubleshoot product errors may include (1) monitoring Internet searches submitted by a user of a computing device to a search engine executing within a browser installed on the computing device, (2) identifying, while monitoring the Internet searches, a search including a description of an error in a product installed on the computing device, (3) in response to identifying the search, automatically enabling debug logging for the product on the computing device, and (4) maintaining an event log including information collected from the debug logging that may be used to diagnose the error. Various other methods, systems, and computer-readable media are also disclosed.

20 Claims, 6 Drawing Sheets

(56) References Cited

OTHER PUBLICATIONS

Sunil K, How to Use Debug Logs in Salesforce to Troubleshoot, http://www.dhruvsoft.com/blog/how-to-use-debug-logs-in-salesforce-to-troubleshoot/, as accessed Mar. 2, 2016, (Jul. 8, 2013).
How to debug the Symantec Endpoint Protection client, https://support.symantec.com/en_US/article.TECH102412.html, TECH102412, Symantec Corporation, (Sep. 7, 2015).
Debug log, https://us.norton.com/security_response/glossary/define.jsp?letter=d&word=debug-log, as accessed Mar. 2, 2016, Glossary, Symantec Corporation, (Jan. 22, 2014).
Use advanced debug logging options for the Symantec Endpoint Protection client in SymDiag, https://support.symantec.com/en_US/article.TECH207795.html, TECH207795, Symantec Corporation, (Mar. 3, 2016).
Logfile, https://en.wikipedia.org/wiki/Logfile, as accessed Mar. 2, 2016, Wikipedia, (Aug. 13, 2013).
Web browser, https://en.wikipedia.org/wiki/Web_browser, as accessed Mar. 2, 2016, Wikipedia, (Feb. 3, 2004).
Event (computing), https://en.wikipedia.org/wiki/Event_(computing)#Device_events, as accessed Mar. 2, 2016, Wikipedia, (Sep. 30, 2009).
Browser extension, https://en.wikipedia.org/wiki/Browser_extension, as accessed Mar. 2, 2016, Wikipedia, (Sep. 13, 2006).
What is the Norton toolbar?, https://www.reference.com/technology/norton-toolbar-cf251f8fdb3847f3, as accessed Mar. 2, 2016, (on or before Mar. 2, 2016).
Web beacon, http://srjcstaff.santarosa.edu/~dpearson/mirrored_pages/wikipedia.org/Web_bug.htm, as accessed Mar. 2, 2016, Wikipedia, (on or before Mar. 2, 2016).
Vangie Beal, Web beacon, http://www.webopedia.com/TERM/W/Web_beacon.html, as accessed Mar. 2, 2016, Webopedia, (Aug. 9, 2002).
SymQual, https://sites.google.com/a/symqual.com/sites/system/app/pages/meta/domainWelcome, as accessed Mar. 2, 2016, Google Apps, (on or before Mar. 2, 2016).

* cited by examiner

SYSTEMS AND METHODS FOR COLLECTING ERROR DATA TO TROUBLESHOOT PRODUCT ERRORS

BACKGROUND

After a program is released to the public, the program will inevitably generate some errors. If a user is presented with such an error while he is using the program, he may first attempt the remediate the error himself. For example, the user's first recourse may be to search the Internet for solutions. If the user is unable to find a solution on his own, he may then contact a support team for help troubleshooting the error. The support team will often ask the user for some kind of error history and attempt to solve the problem based on the history.

If the information obtained from the user's response is insufficient to solve the problem, the support team may, in some cases, ask the user to enable debug logging for the product to obtain more detailed information. Unfortunately, this back and forth may be tedious, time consuming, and labor intensive. Accordingly, the instant disclosure identifies a need for improved systems and methods for quickly obtaining the necessary background information to respond to program errors experienced by users.

SUMMARY

As will be described in greater detail below, the instant disclosure describes various systems and methods for collecting error data to troubleshoot product errors. In one example, a computer-implemented method for collecting error data to troubleshoot product errors may include (1) monitoring Internet searches submitted by a user of the computing device to a search engine executing within a browser installed on the computing device, (2) identifying, while monitoring the Internet searches, a search including a description of an error in a product installed on the computing device, (3) in response to identifying the search, automatically enabling debug logging for the product on the computing device, and (4) maintaining an event log including information collected from the debug logging that may be used to diagnose the error.

In some examples, the browser may include a browser extension. This browser extension may operate as part of a service associated with the product. In these examples, the browser extension may perform one or more of the steps in the method. For example, the browser extension may perform the monitoring and identifying steps.

In one embodiment, identifying the search may include determining that one or more search terms within the search describe the error. In an additional or alternative example, identifying the search may include determining that one or more websites identified by the search engine include troubleshooting material relating to the error.

In some examples, enabling debug logging may include enabling logging event information for the product while the product is executing. In one embodiment, enabling debug logging may include modifying a product registry setting. In this embodiment, the modifying of the product registry setting may be automatically triggered when the search is identified.

In some embodiments, the product may include a group of components. In these embodiments, enabling debug logging may include enabling debug logging for only a subset of the components. In some such embodiments, the disclosed method may further include determining, based on the description identified in the search, that the error corresponds to a particular component within the components. In these embodiments, enabling debug logging for the subset of the components may include enabling debug logging for the particular component.

In some examples, the disclosed method may further include disabling debug logging after (1) a predetermined amount of time lapses, (2) a predetermined amount of data is collected, and/or (3) the product stops executing on the computing device. In one example, the disclosed method may further include uploading the event log to (1) a server associated with the product and/or (2) an additional computing device of an additional user who provides troubleshooting support for the product.

In some examples, the disclosed method may further include relaying information collected from the search to a web portal. In these examples, the web portal may, upon detecting that the user has logged into the web portal, automatically enable debug mode for a user session initiated by the user logging into the web portal. In one example, the web portal may enable debug mode based on having received the information collected from the search. Additionally or alternatively, the web portal may enable debug mode based on a search history of the user.

In some embodiments, a version of the product installed on the computing device may not include debug capabilities. In these examples, the method may further include (1) determining that the version of the product installed on the computing device does not include debug capabilities, (2) querying a server associated with the product for a version of the product that includes debug capabilities, and (3) receiving, from the server, the version of the product that includes debug capabilities. In these examples, enabling debug logging may include (1) installing the version of the product that includes debug capabilities on the computing device and (2) enabling debug logging for the version of the product that includes debug capabilities.

In one embodiment, a system for implementing the above-described method may include (1) a monitoring module, stored in memory, that (i) monitors Internet searches submitted by a user of the computing device to a search engine executing within a browser installed on the computing device and (ii) identifies, while monitoring the Internet searches, a search including a description of an error in a product installed on the computing device, (2) an enabling module, stored in memory, that, in response to the monitoring module identifying the search, automatically enables debug logging for the product on the computing device, (3) a maintaining module, stored in memory, that maintains an event log including information collected from the debug logging that may be used to diagnose the error, and (4) at least one physical processor configured to execute the monitoring module, the enabling module, and the maintaining module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor Internet searches submitted by a user of the computing device to a search engine executing within a browser installed on the computing device, (2) identify, while monitoring the Internet searches, a search including a description of an error in a product installed on the computing device, (3) in response to identifying the search, automatically enable debug logging for the product on the computing device, and (4) maintain an event log including information collected from the debug logging that may be used to diagnose the error.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
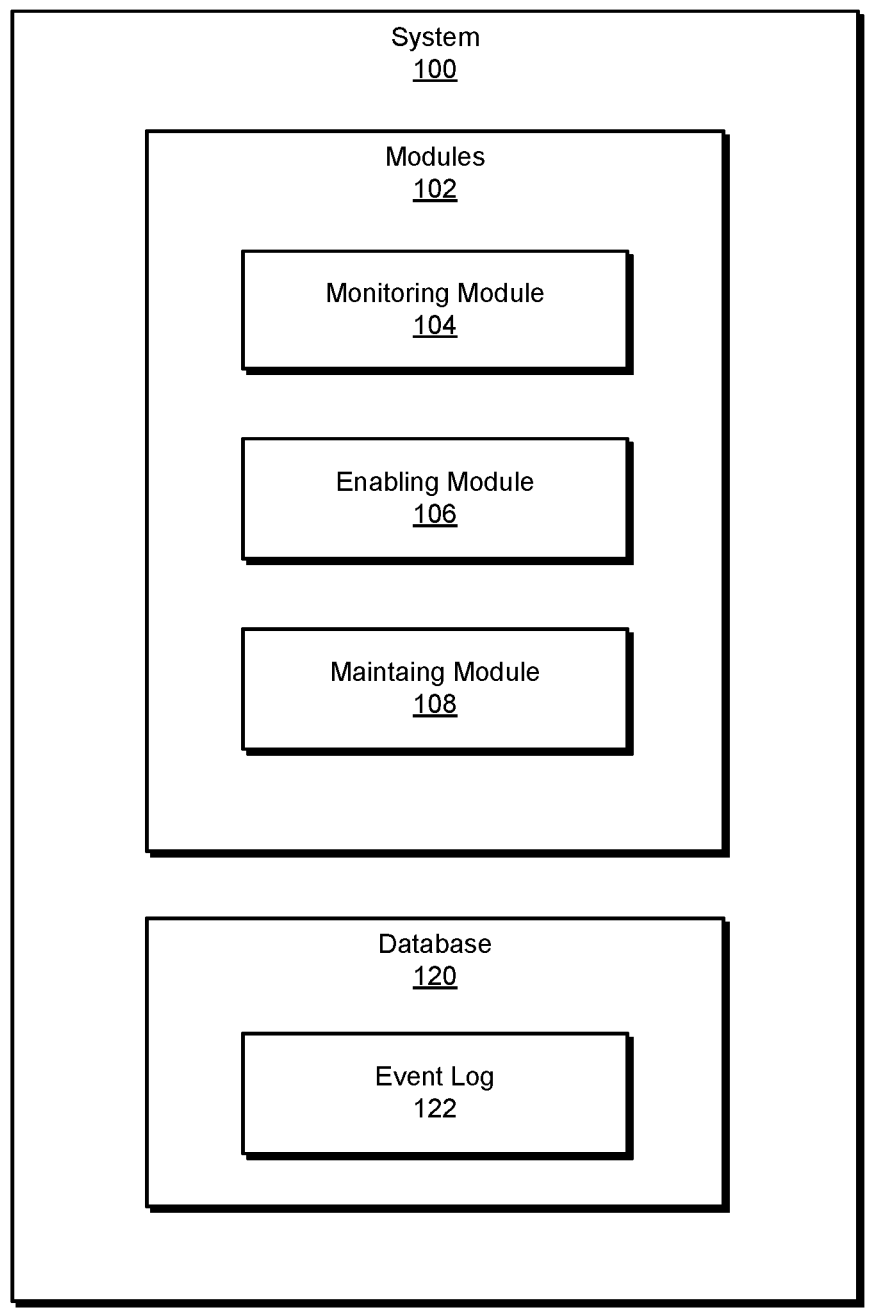
FIG. 1 is a block diagram of an exemplary system for collecting error data to troubleshoot product errors.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for collecting error data to troubleshoot product errors. As will be explained in greater detail below, the disclosed systems and methods may reduce the amount of time required to troubleshoot an error occurring within a product by (1) anticipating that a user may benefit from a debug log for the product and (2) automatically enabling debug logging for the product (i.e., without the human manually enabling debug logging).

In some examples, the disclosed systems and methods may anticipate that the user may benefit from a debug log based on an Internet search of the user. For example, the disclosed systems and methods may determine that the user is searching the Internet for solutions to a product error and this determination may trigger enabling debug logging for the product. Thus, as will be described in greater detail below, by initiating debug logging in response to identifying Internet searches directed at troubleshooting product errors (e.g., instead of waiting for a human to manually initiate debug logging), the disclosed systems and methods may accelerate the troubleshooting process.

Figure 2:
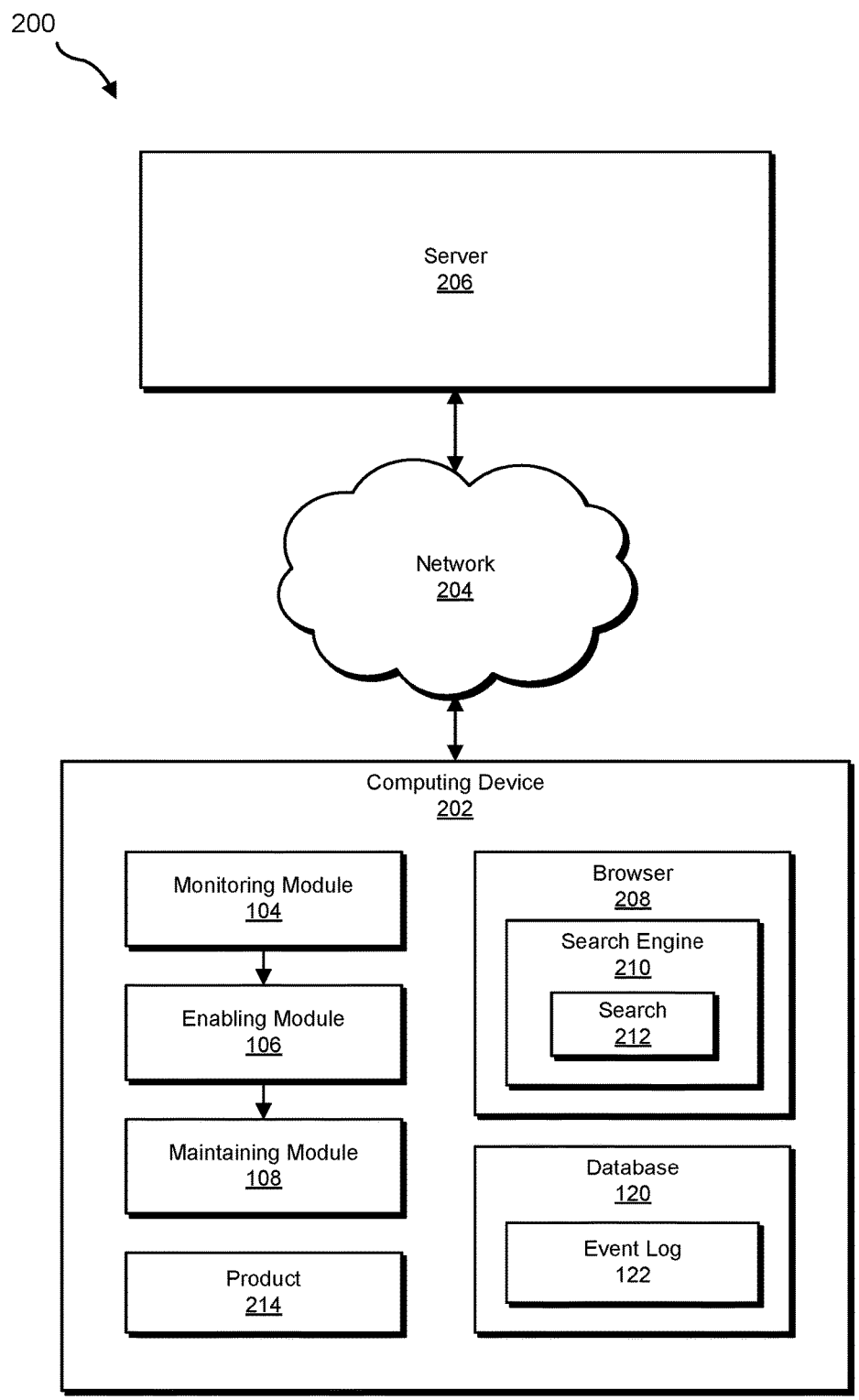
FIG. 2 is a block diagram of an additional exemplary system for collecting error data to troubleshoot product errors.

The following will provide, with reference to FIGS. 1-2, detailed descriptions of exemplary systems for collecting error data to troubleshoot product errors. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for collecting error data to troubleshoot product errors. As illustrated in this figure, exemplary system 100 may include one or more modules 102 for performing one or more tasks. For example, and as will be explained in greater detail below, exemplary system 100 may include a monitoring module 104 that monitors Internet searches submitted by a user of the computing device to a search engine executing within a browser installed on the computing device. In some examples, monitoring module 104 may identify, while monitoring the Internet searches, a search that includes a description of an error in a product installed on the computing device. Exemplary system 100 may also include an enabling module 106 that enables debug logging for the product on the computing device. Exemplary system 100 may additionally include a maintaining module 108 that maintains an event log that includes information collected from the debug logging that may be used to diagnose the error. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store an event log 122. Database 120 may represent portions of a single database or computing device or a plurality of databases or computing devices. For example, database 120 may represent a portion of computing device 202 and/or server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to collect error data to troubleshoot product errors. For example, and as will be described in greater detail below, monitoring module 104 may monitor Internet searches submitted by a user of computing device 202 to a search engine 210 executing within a browser 208 installed on computing device 202. Monitoring module 104 may then identify, while monitoring the Internet searches, a search 212 including a description of an error in a product 214 installed on computing device 202. In response, enabling module 106 may enable debug logging for product 214 on computing device 202. Maintaining module 108 may then maintain an event log 122 including information collected from the debug logging that may be used to diagnose the error.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of assisting in troubleshooting product errors. Examples of server 206 include, without limitation, application servers and database servers configured to provide various database services and/or run certain software applications. In some examples, server 206 may provide one or more services to computing device 202. In one such example, server 206 may provide services to computing device 202 via a product, such as product 214, and/or a browser extension. In some embodiments, the services provided by server 206 may include one or more security-related services (e.g., an anti-malware service, a data-loss-protection service, an encryption service, etc.). In some examples, computing device 202 may be configured to transmit troubleshooting information to server 206 (e.g., if product 214 produces an error).

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Product 214 generally represents any type or form of application installed on computing device 202. As used herein, the term "application" refers to any computer program that causes a computing system, such as computing device 202, to perform useful tasks. In some examples, product 214 may represent, without limitation, a software application, a device driver, an application plug-in, an operating system function, and/or any other set of computer-executable code. In some examples, product 214 may represent an application developed and/or managed by a service that manages server 206.

Browser 208 generally represents any type or form of application that locates, retrieves, and/or presents content (such as a webpage, an image, or a video) on the Internet and/or on a private network. In some examples, browser 208 may present a search engine 210 to the user. In one embodiment, browser 208 may include a browser extension capable of monitoring Internet activity conducted via browser 208. In some such embodiments, the browser extension and product 214 may both operate as part of a same service.

Search engine 210 generally represents any type or form of application that searches for and/or identifies content in a database. In one example, search engine 210 may search for and/or identify content on the Internet. In this example, search engine 210 may search for and/or identify webpages. In some examples, search engine 210 may search for content that relates to keywords submitted by a user (e.g., via a peripheral auxiliary device such as a keyboard) in a search, such as search 212.

Event log 122 generally represents any type or form of data structure (e.g., a text file) that maintains troubleshooting information for a program. In some examples, this information may be obtained as a result of debug logging. Information maintained by event log 122 may include, without limitation, data and time stamp information, build number information, operating system version information, and/or error information. In some examples, event log 122 may maintain event information.

As used herein, the term "event" refers to any action or occurrence that is recognized and/or handled by product 214. In some examples, an event may be initiated by input received from the user (e.g., via a keystroke from a keyboard coupled to computing device 202 and/or a mouse click from a mouse coupled to computing device 202). To give a specific example, the user may, via a mouse click, select a graphical user interface element displayed by product 214 that is labeled "scan my system for malware." In this specific example, the user's selection may invoke a series of functions within product 214 that accomplish the task initiated by the user (i.e., scanning the user's system for malware). In this specific example, an event may represent the full flow of execution triggered by the user's selection. In some examples, this flow of execution may serve as an audit trail that may be used to understand the activity of product 214 and to diagnose problems.

Figure 3:
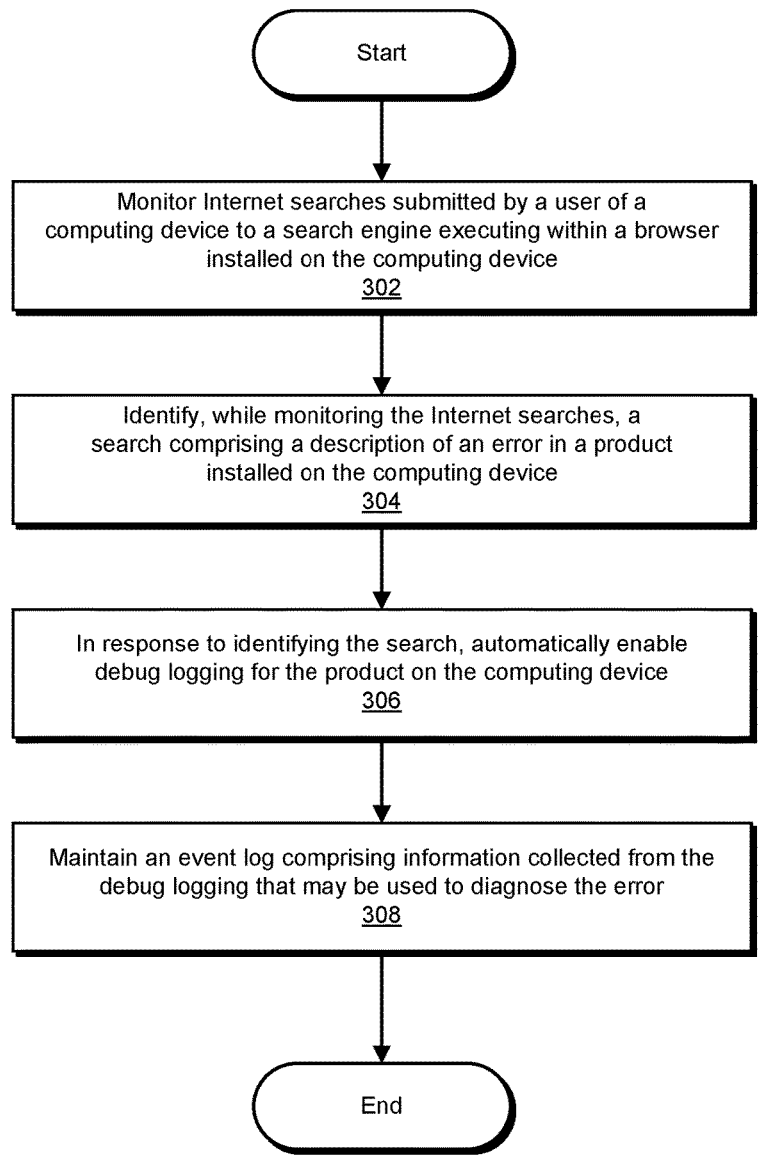
FIG. 3 is a flow diagram of an exemplary method for collecting error data to troubleshoot product errors.
Figure 4:
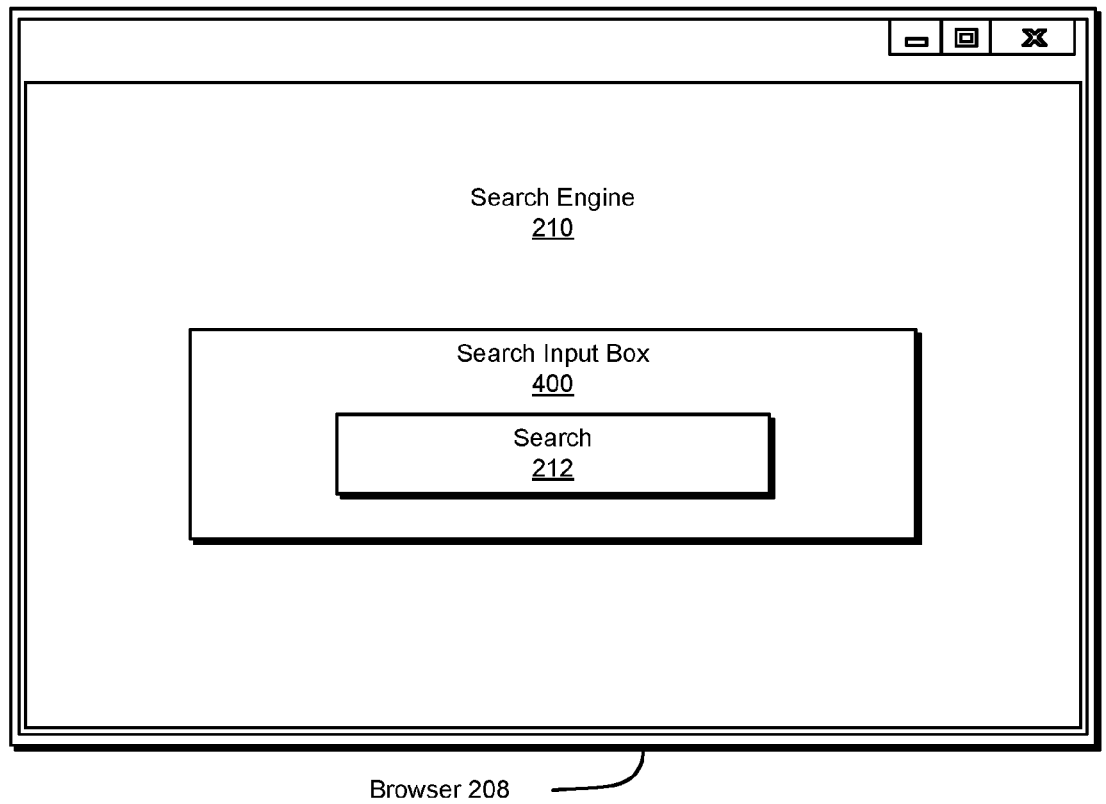
FIG. 4 is a block diagram of an exemplary browser used for identifying search terms submitted by a user.

FIG. 3 is a flow diagram of an exemplary computer-implemented method 300 for collecting error data to troubleshoot product errors. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may monitor Internet searches submitted by a user of a computing device to a search engine executing within a browser installed on the computing device. For example, monitoring module 104 may, as part of computing device 202 in FIG. 2, monitor Internet searches submitted by a user of computing device 202 to search engine 210 executing within browser 208 installed on computing device 202.

Monitoring module 104 may monitor a user's Internet searches in a variety of ways. Using FIG. 4 as a specific example, monitoring module 104 may monitor search 212 submitted by a user (e.g., via input to a peripheral auxiliary device such as a keyboard) into a search input box 400 displayed in a graphical user interface of search engine 210 within browser 208. In one example, monitoring module 104 may monitor all Internet activity conducted via browser 208. In this example, monitoring module 104 may monitor Internet searches as part of monitoring all of the Internet activity occurring via browser 208. In another example, monitoring module 104 may only monitor Internet searches.

In some examples, monitoring module 104 may monitor the user's Internet searches by identifying and analyzing various aspects of the Internet searches. For example, monitoring module 104 may identify search terms within search 212. In this example, monitoring module 104 may then analyze the search terms to determine whether the search terms describe an error occurring in product 214 and/or describe a request for help resolving an error occurring in product 214, as will be described in greater detail below in connection with step 304.

In another example, monitoring module 104 may identify websites listed by search engine 210 in response to search engine 210 receiving search 212. In this example, monitoring module 104 may then analyze the list of websites to determine whether one or more of the websites relate to troubleshooting errors occurring in product 214, as will be described in greater detail below in connection with step 304.

In some examples, monitoring module 104 may operate as part of a browser extension. As used herein the term "browser extension" generally refers to a plug-in and/or a toolbar that extends the functionality of a browser, such as browser 208. In these examples, one of the functions provided by the browser extension may include monitoring Internet searches. In some examples, the browser extension may increase the security of computing device 202 (e.g., by providing website authentication, protection against phishing, login and password saving, encryption, etc.). In some examples, the browser extension may function as part of a service (e.g., a security service) that is also associated with product 214. For example, computing device 202 may have initially received both the browser extension and product 214 as part of a same installation package.

Returning to FIG. 3, at step 304, one or more of the systems described herein may identify, while monitoring the Internet searches, a search including a description of an error in a product installed on the computing device. For example, monitoring module 104 may, as part of computing device 202 in FIG. 2, identify, while monitoring the user's Internet searches, search 212 including a description of an error in product 214 installed on computing device 202.

Monitoring module 104 may identify search 212 in a variety of ways. In one embodiment, monitoring module 104 may be screening for searches that are directed at troubleshooting an error. In some examples, monitoring module 104 may be screening for searches relating to product errors occurring in any product. In other examples, monitoring module 104 may be specifically screening for searches relating to product errors occurring in a particular product (such as product 214). In this embodiment, monitoring module 104 may identify search 212, as a result of screening for searches directed at troubleshooting an error, based on determining that search 212 relates to a product error.

Monitoring module 104 may determine that search 212 relates to a product error in a variety of ways. In one example, monitoring module 104 may determine that search 212 relates to a product error by determining that one or more search terms within search 212 describe a product error. For example, monitoring module 104 may determine that search terms within search 212 include (1) an identifier (e.g., a name) of product 214, an identifier of a component of product 214, and/or an identifier of an entity associated with product 214, and (2) a description of an error.

To give a specific example, monitoring module 104 may identify the words "SYMANTEC ENDPOINT PROTECTION installs, but no green dot/no server communication" within search 212. In this specific example, monitoring module 104 may determine that search 212 describes a product error because keywords include (1) an identifier of a product (i.e., "SYMANTEC ENDPOINT PROTECTION") and (2) a description of an error (i.e., "installs, but no green dot/no server communication").

In additional or alternative examples, monitoring module 104 may determine that search 212 relates to a product error by determining that one or more websites listed by search engine 210, in response to search engine 210 receiving search 212, include troubleshooting material relating to a product error. In these examples, monitoring module 104 may determine that the websites include troubleshooting material based on information collected from a browser extension running within browser 208.

At step 306, one or more of the systems described herein may, in response to identifying a search, enable debug logging for the product on the computing device. For example, enabling module 106 may, as part of computing device 202 in FIG. 2 and in response to monitoring module 104 identifying search 212, enable debug logging for product 214 on computing device 202.

As used herein, the "debug logging" generally refers to recording any type or form of troubleshooting information for product 214 (e.g., while product 214 is executing) in a data structure, such as an event log. In some examples, debug logging may refer to recording event information for product 214. In some examples, product 214 may be configured to have debug logging disabled (e.g., by default) unless a system and/or user enables debug logging.

Enabling module 106 may enable debug logging in a variety of ways. In some examples, enabling module 106 may enable debug logging by modifying a product registry setting. For example, enabling module 106 may modify a portion of a product registry setting that reads "debuglog_off" such that the portion of the product registry setting instead reads "debuglog_on." In these examples, the modifying of the product registry setting may be automatically triggered when search 212 is identified. For example, enabling module 106 may be configured to automatically modify the product registry setting in response to monitoring module 104 determining that search 212 is directed at troubleshooting a product error.

In some embodiments, product 214, as installed on computing device 202, may not include debug capabilities. In these embodiments, enabling module 106 may receive and install a different version of product 214 from server 206 that includes debug capabilities. For example, enabling module 106 may, in response to monitoring module 104 identifying search 212, (1) determine that the version of product 214 installed on computing device 202 does not include debug capabilities and (2) query server 206 for the different version of product 214 that does include debug capabilities.

In some examples, product 214 may include multiple components. For example, if product 214 represents a security product, the components may include an antivirus component, an antispyware component, a group update provider component, a communications component, a driver component, etc. In these examples, enabling module 106 may enable debug logging for only a subset of the components. For example, enabling module 106 may (1) determine, based on the description identified in search 212, that the error corresponds to a particular component of product 214 and (2) only enable debug logging for the particular component of product 214.

In some embodiments, enabling module 106 may automatically disable debug logging at some moment in time after debug logging is enabled. In one example, enabling module 108 may disable debug logging after a predetermined amount of time lapses (e.g., an hour, twenty minutes, a day, etc.). In another example, enabling module 106 may disable debug logging after a predetermined amount of data is collected. For example, enabling module 108 may disable debug logging after an event log (such as event log 122) reaches a certain size. To give a specific example, if the size of event log 122 is limited to 256 KB, enabling module 108 may disable debug logging after the size of event log 122 reaches 256 KB. In another example, enabling module 106 may disable debug logging when product 214 stops executing. For example, enabling module 108 may disable debug logging when product 214 is closed (e.g., by the user) and/or computing device 202 shuts down.

In addition or as an alternative to enabling debug logging for product 214, enabling module 106 may (e.g., in response to monitoring module 104 identifying search 212) relay information collected from search 212 to a webpage. In one example, enabling module 106 may relay the collected information to a web portal managed by server 206. As used herein, the term "web portal" generally refers to any type or form of online web service that offers one or more resources and/or services that may be accessed from a browser-capable device.

To give a specific example, if search 212 includes the search terms "Norton IDSafe portal does not list my vault values," enabling module 106 may, in response to monitoring module 104 identifying these search terms, transmit certain information to the Norton IDSafe portal. For example, enabling module 106 may transmit (1) user information describing the user and (2) information describing the error potentially being experienced by the user. In some examples, the information describing the error may be general (e.g., that the user is experiencing difficulty with the Norton IDSafe portal). In other examples, the information describing the error may specifically describe the problem described in search 212 (i.e., that Norton IDSafe portal is not listing the user's vault values).

In some examples, the user may log into the web portal after enabling module 106 has transmitted information collected from search 212 to the web portal. In these examples, the web portal may automatically enable debug mode (e.g., for resources offered by the web portal) for the duration of a user session initiated when the user logged into the web portal. In one embodiment, the web portal may enable debug mode in response to having previously received the collected information from enabling module 106. Additionally or alternatively, the web portal may enable debug mode based on a search history of the user. For example, the web portal may enable debug mode if the user has experienced difficulty with resources offered by the web portal in the past and/or if the user has previously attempted to troubleshoot the same error described in search 212.

In some examples, the web portal may enable debug mode by sending the user a debug version of one or more webpages accessed during the user session (e.g., instead of sending the user a normal version of the webpages). In one embodiment, the debug version of the webpages may be laden with web beacons. As used herein, the term "web beacon" generally refers to any type or form of object embedded in a webpage that monitors the behavior of a user visiting the webpage.

At step 308, one or more of the systems described herein may maintain an event log including information collected from debug logging that may be used to diagnose an error. For example, maintaining module 108 may, as part of computing device 202 in FIG. 2, maintain event log 122 that may be used to diagnose an error in product 214.

Maintaining module 108 may maintain event log 122 in a variety of locations. In one example, maintaining module 108 may maintain event log 122 in a program data directory of product 214. In another example, maintaining module 108 may maintain event log 122 in an installation directory of product 214.

In some examples, event log 122 may include a record of event information for events that are triggered by a user applying various troubleshooting solutions to product 214 (e.g., troubleshooting solutions obtained by the user as a result of search 212). In these examples, the disclosed systems and methods may capture information relating to how product 214 responds to the user's troubleshooting attempts—information that may not otherwise have been recorded had debug logging not been automatically enabled in response to monitoring module 104 identifying search 212.

In examples where enabling module 106 only enables debug logging for one or more components of product 214 (as described above in connection with step 306), maintaining module 108 may maintain an event log that logs only events occurring within the components for which debug logging has been enabled. For example, if enabling module 106 enables debug logging for a communications component of product 214, event log 122 may include a record of events occurring within the communications component of product 214 while product 214 is executing, but may not include a record of events occurring within other components of product 214.

In some embodiments, maintaining module 108 may upload event log 122 to a troubleshooting location. For example, maintaining module 108 may upload event log 122 to a server associated with product 214 (e.g., server 206). In another example, maintaining module 108 may upload product 214 to an additional computing device. For example, maintaining module 108 may upload product 214 to an additional computing device of a product engineer who provides troubleshooting support for the product.

In one example, maintaining module 108 may upload event log 122 automatically (e.g., once event log 122 reaches a certain size and/or a certain event is detected). In another example, maintaining module 108 may upload event log 122 in response to receiving user input instructing maintaining module 108 to perform the upload.

As explained above, the disclosed systems and methods may enable automatically creating a debug log for use in troubleshooting product errors. In some examples, the disclosed systems and methods may automatically create the debug log in response to identifying (e.g., via a browser toolbar) certain Internet searches submitted by a user. For example, the disclosed systems and methods may enable debug logging if a user submits an Internet search that indicates that the user is trying to troubleshoot a problem encountered by an instance of a product.

By automatically switching the product into debug mode when such an Internet search is identified, the disclosed systems and methods may automatically collect detailed information relating to a problem before the user requests and/or otherwise initiates obtaining the information. This information may then be available for the user (and/or a support staff engineer assisting the user) to use in troubleshooting the problem.

In some examples, the debug logging may collect information describing how the product responds as the user performs different troubleshooting actions (e.g., troubleshooting actions the user reads about from webpages obtained as a result of an Internet search). In one example, the user may (e.g., after performing the Internet search) contact product support staff for help (e.g., using a telephone or instant messaging application). In this example, the debug log may be immediately ready and available for the support staff engineer to examine as soon as the user contacts the support staff engineer. Making an immediately available debug log may be beneficial (1) because it expedites the time required to troubleshoot the problem and (2) because it reduces the amount of labor required by the user.

Thus, the disclosed systems and methods may be especially useful if a user (1) searches the Internet for solutions to a product error and (2) later calls a support staff engineer for help addressing the product error. In such an instance, the disclosed systems and methods may allow the support staff engineer to obtain the debug log created automatically by the disclosed systems and methods without the support staff engineer having to ask the user to give a history of the error or manually switch the product into debug mode.

Figure 5:
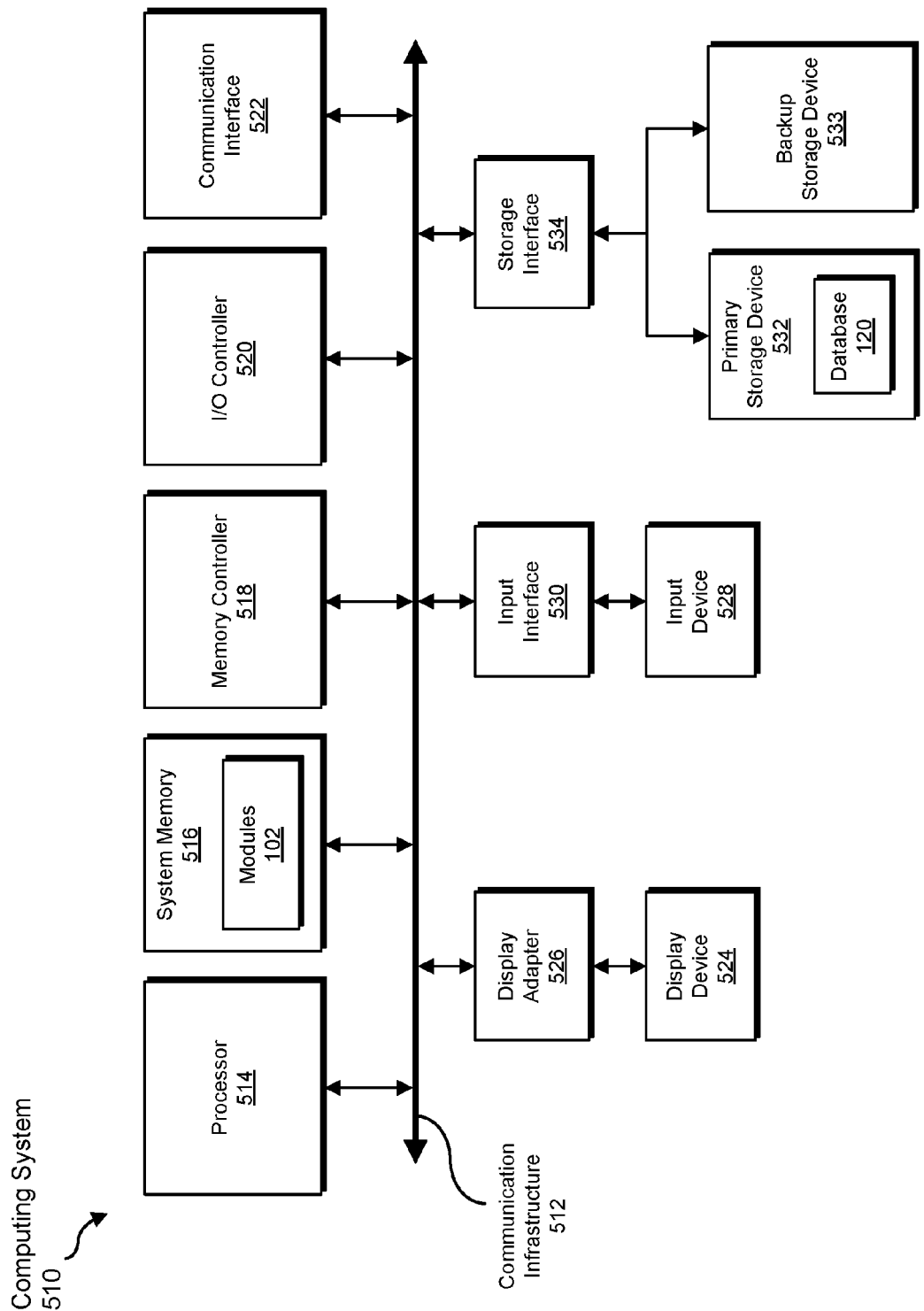
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface.

In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
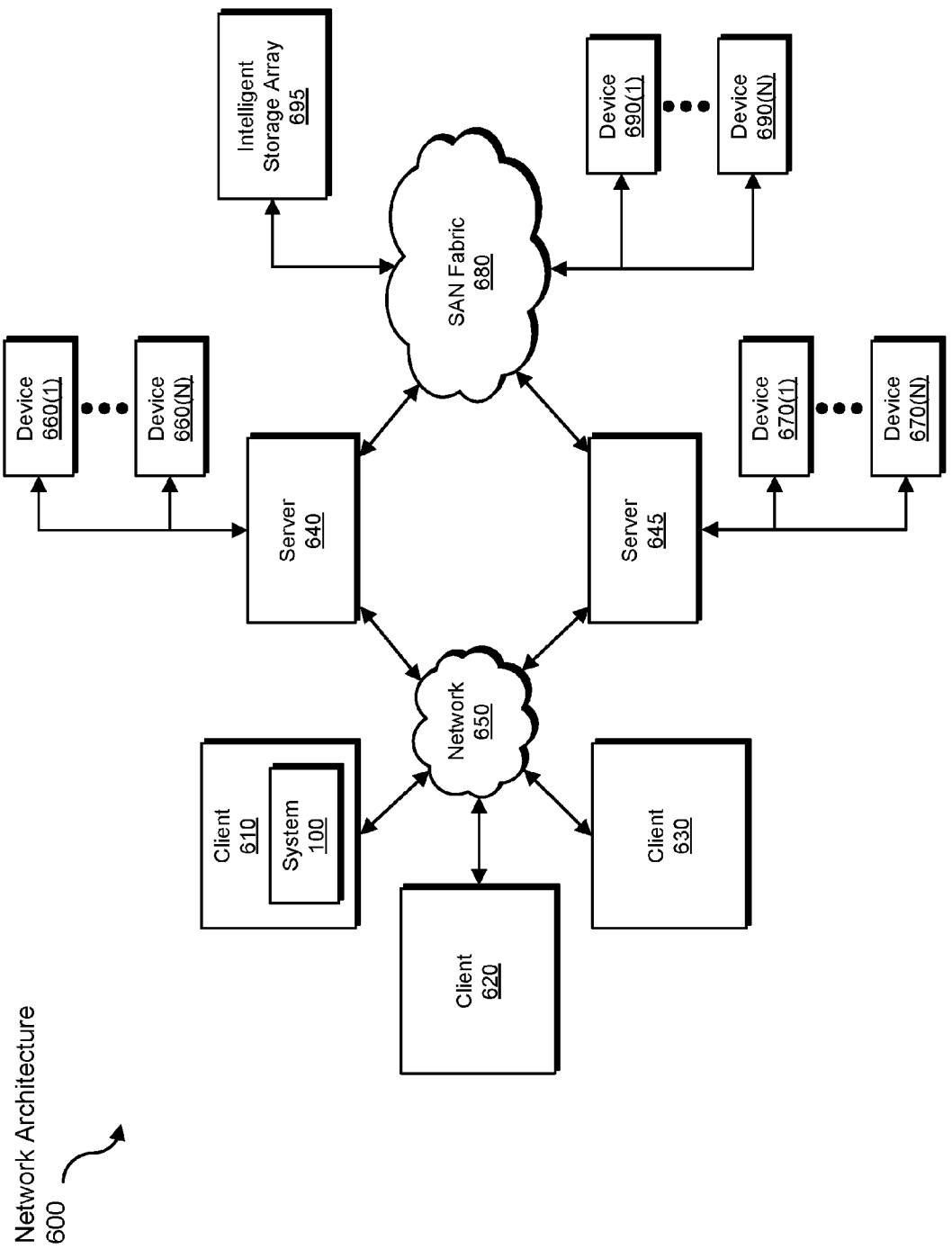
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for collecting error data to troubleshoot product errors.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like.

In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may (1) receive input from a peripheral auxiliary device coupled to a user's computer, (2) transform the input into an Internet search, and (3) use the Internet search as the basis for switching a product into debug mode. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for collecting error data to troubleshoot product errors, at least a portion of the method being performed by a computing device comprising at least one processor, the method comprising:
    monitoring Internet searches submitted by a user of the computing device to a search engine executing within a browser installed on the computing device;
    identifying, while monitoring the Internet searches, a search comprising a description of an error in a product installed on the computing device;
    in response to identifying the search, automatically enabling debug logging for the product on the computing device;
    maintaining an event log comprising information collected from the debug logging that may be used to diagnose the error.

2. The computer-implemented method of claim 1, wherein:
    the browser includes a browser extension that operates as part of a service associated with the product;
    the monitoring and identifying steps are performed by the browser extension.

3. The computer-implemented method of claim 1, wherein identifying the search comprises determining that one or more search terms within the search describe the error.

4. The computer-implemented method of claim 1, wherein identifying the search comprises determining that one or more websites identified by the search engine comprise troubleshooting material relating to the error.

5. The computer-implemented method of claim 1, wherein enabling debug logging comprises enabling logging event information for the product while the product is executing.

6. The computer-implemented method of claim 1, wherein:
    enabling debug logging comprises modifying a product registry setting;
    the modifying of the product registry setting is automatically triggered when the search is identified.

7. The computer-implemented method of claim 1, wherein:
    the product comprises a plurality of components;
    enabling debug logging comprises enabling debug logging for only a subset of the components.

8. The computer-implemented method of claim 7, further comprising:
    determining, based on the description identified in the search, that the error corresponds to a particular component within the plurality of components;

wherein enabling debug logging for the subset of the components comprises enabling debug logging for the particular component.

9. The computer-implemented method of claim 1, further comprising disabling debug logging after at least one of:
   a predetermined amount of time lapses;
   a predetermined amount of data is collected;
   the product stops executing on the computing device.

10. The computer-implemented method of claim 1, further comprising uploading the event log to at least one of:
    a server associated with the product;
    an additional computing device of an additional user who provides troubleshooting support for the product.

11. The computer-implemented method of claim 1, further comprising relaying information collected from the search to a web portal, wherein the web portal, upon detecting that the user has logged into the web portal, automatically enables debug mode for a user session initiated by the user logging into the web portal.

12. The computer-implemented method of claim 11, wherein the web portal enables debug mode for the user session based on at least one of:
    having received the information collected from the search;
    a search history of the user.

13. The computer-implemented method of claim 1, further comprising, in response to identifying the search:
    determining that a version of the product installed on the computing device does not include debug capabilities;
    querying a server associated with the product for a version of the product that includes debug capabilities;
    receiving, from the server, the version of the product that includes debug capabilities;
    wherein enabling debug logging comprises:
      installing the version of the product that includes debug capabilities on the computing device;
      enabling debug logging for the version of the product that includes debug capabilities.

14. A system for collecting error data to troubleshoot product errors, the system comprising:
    a monitoring module, stored in memory, that:
      monitors Internet searches submitted by a user of a computing device to a search engine executing within a browser installed on the computing device;
      identifies, while monitoring the Internet searches, a search comprising a description of an error in a product installed on the computing device;
    an enabling module, stored in memory, that, in response to the monitoring module identifying the search, automatically enables debug logging for the product on the computing device;
    a maintaining module, stored in memory, that maintains an event log comprising information collected from the debug logging that may be used to diagnose the error;
    at least one physical processor configured to execute the monitoring module, the enabling module, and the maintaining module.

15. The system of claim 14, wherein:
    the browser includes a browser extension that operates as part of a service associated with the product;
    the monitoring module operates as part of the browser extension.

16. The system of claim 14, wherein the monitoring module identifies the search by determining that one or more search terms within the search describe the error.

17. The system of claim 14, wherein the monitoring module identifies the search by determining that one or more websites identified by the search engine comprise troubleshooting material relating to the error.

18. The system of claim 14, wherein the enabling module enables debug logging by enabling logging event information for the product while the product is executing.

19. The system of claim 14, wherein:
    the enabling module enables debug logging by modifying a product registry setting;
    the modifying of the product registry setting is automatically triggered when the search is identified.

20. A non-transitory computer-readable medium comprising one or more computer-readable instructions that, when executed by at least one processor of a computing device, cause the computing device to:
    monitor Internet searches submitted by a user of the computing device to a search engine executing within a browser installed on the computing device;
    identify, while monitoring the Internet searches, a search comprising a description of an error in a product installed on the computing device;
    in response to identifying the search, automatically enable debug logging for the product on the computing device;
    maintain an event log comprising information collected from the debug logging that may be used to diagnose the error.

* * * * *

UNITED STATES PATENT AND TRADEMARK OFFICE
CERTIFICATE OF CORRECTION

PATENT NO.        : 10,061,683 B2
APPLICATION NO.   : 15/150670
DATED             : August 28, 2018
INVENTOR(S)       : Anand Sankruthi et al.

It is certified that error appears in the above-identified patent and that said Letters Patent is hereby corrected as shown below:

On the Title Page

In Column 1, below Item "(65)", insert:
-- (30) Foreign Application Priority Data
Mar. 22, 2016 (IN) ............... 201621009975 --.

Signed and Sealed this
Fifth Day of February, 2019

Andrei Iancu
*Director of the United States Patent and Trademark Office*